Feb. 6, 1968  W. R. BISHOP  3,367,518
BALE STACKING TRAILER FOR BALERS
Filed March 17, 1965  5 Sheets-Sheet 1

WILLIAM R. BISHOP
INVENTOR

Huebner & Worrel
ATTORNEYS

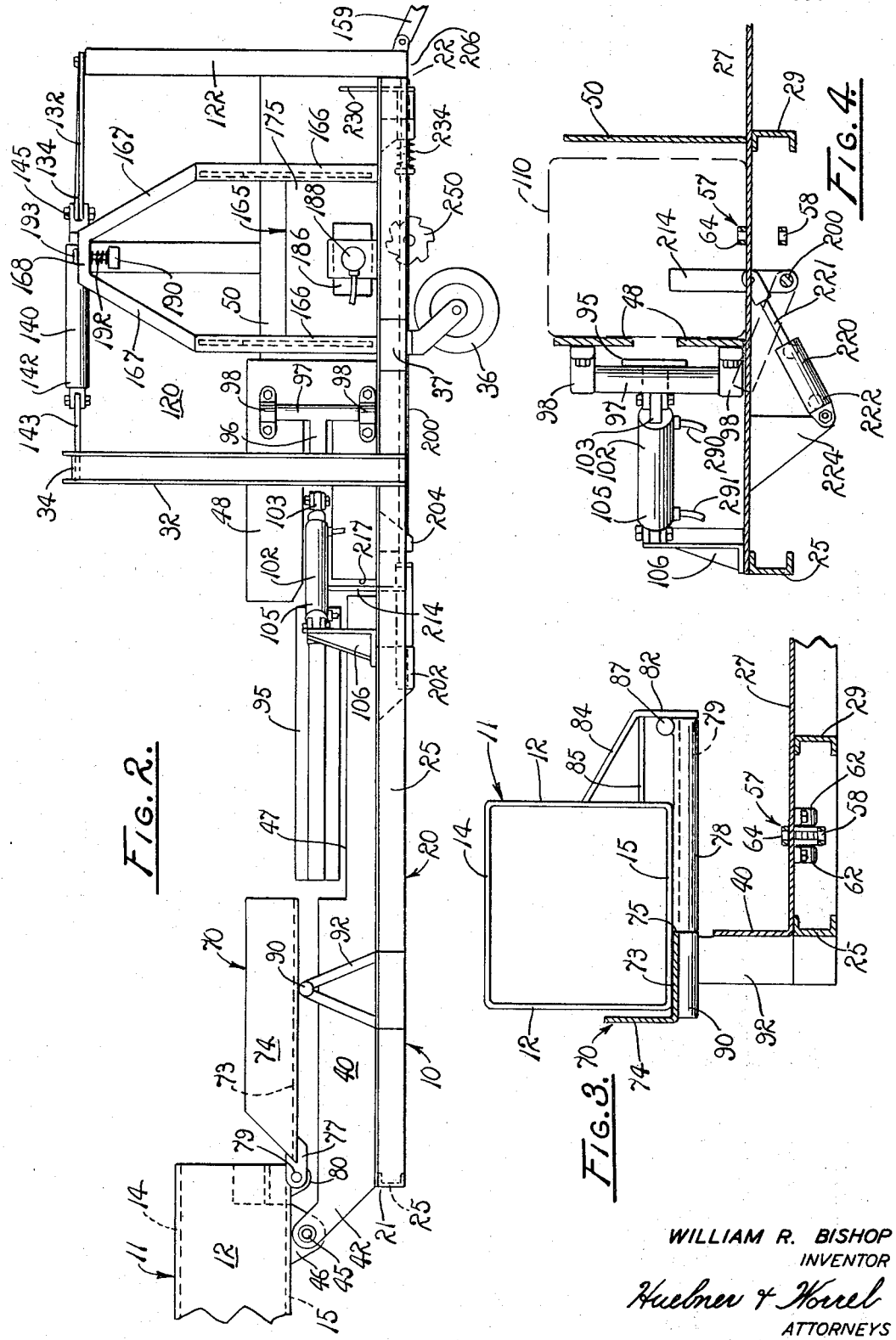

Feb. 6, 1968  W. R. BISHOP  3,367,518
BALE STACKING TRAILER FOR BALERS
Filed March 17, 1965  5 Sheets-Sheet 3

WILLIAM R. BISHOP
INVENTOR

Huebner & Worrel
ATTORNEYS

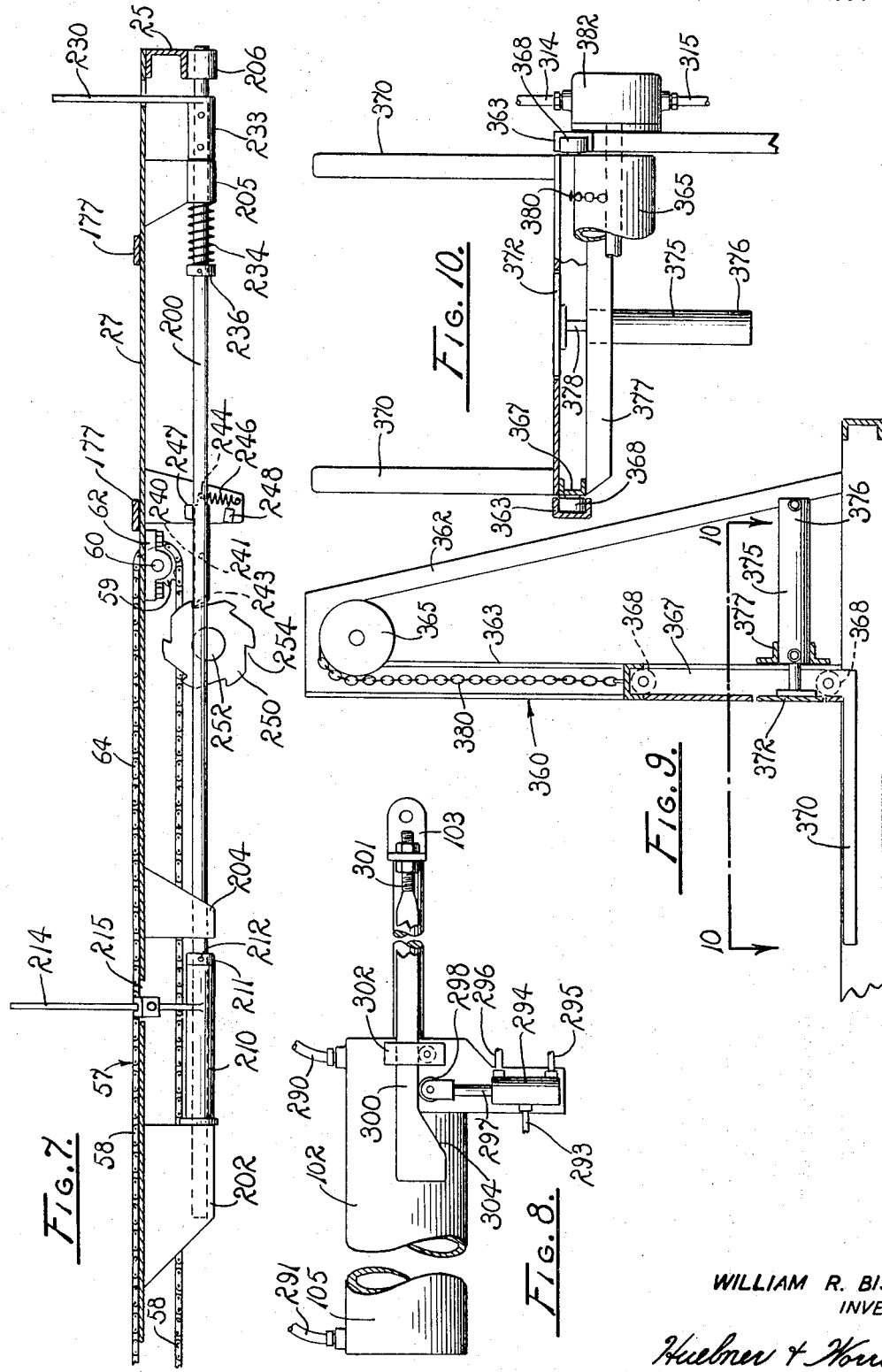

United States Patent Office 3,367,518
Patented Feb. 6, 1968

3,367,518
BALE STACKING TRAILER FOR BALERS
William R. Bishop, P.O. Box 67, Willow Ranch,
Calif. 96138
Filed Mar. 17, 1965, Ser. No. 440,422
10 Claims. (Cl. 214—6)

The present invention relates to a bale stacking trailer for balers and more particularly to such a trailer which forms a multi-layer square stack of bales thereon and which unitarily discharges the bales in such stacked relation.

It is the usual practice during the baling of hay, straw, and other forage crops to discharge the finished bales one at a time onto the ground in scattered relation about the field. The bales are subsequently picked up manually or by mechanical loading mechanisms for transport from the field. This requires an excessive amount of bale handling between the baler and the ultimate storage area. Such procedure has been somewhat improved by discharging the finished bales onto a wagon drawn behind the baler upon which the bales are manually stacked for transport from the field. While eliminating the pickup operation, this procedure still requires manual handling of the bales which is tedious, and time-consuming and which has become increasingly uneconomical. A further improvement has been the introduction of automatic bale stacking attachments for balers. However, these too have certain disadvantages. None of these prior devices have been able dependably to form a stack having any substantial number of bales providing sufficient stability to maintain the desired stacked configuration during discharge from the attachment or during subsequent pick-up from the field. The bale stacking attachment of my copending application Ser. No. 324,261, now Patent No. 3,246,774, entitled "Bale Stacking Attachment for Balers," filed Nov. 18, 1963, has been successful in producing a stack of five bales having greatly improved stability over the stacks produced by the prior art devices. While such structure of my copending application has been successful, there was still recognized areas where improvement was desired.

Therefore, it is an object of the present invention to provide a bale stacking trailer capable of reducing the number of handling operations between baling and ultimate storage of the bales.

Another object is to provide such an improved bale stacking trailer which is capable of forming a square stack of bales of improved stability.

Another object is to provide a bale stacking trailer which is capable of forming an entire stack of bales on the trailer.

Another object is to provide a bale stacking trailer capable of forming such a stack of bales which unitarily discharges such stack of bales from the trailer.

Another object is to provide a bale stacking trailer of the character described which is easily connected to a wide variety of balers.

Another object is to provide a bale stacking trailer which accommodates a wide variety of bale sizes without impairing stack formation or stack stability.

Another object is to provide a bale stacking trailer which has a minimum of mechanical connection to the baler.

Another object is to provide a bale stacking trailer which is capable of utilizing a system of hydraulically powered actuating members to manipulate the bales on the trailer.

Other objects and advantages of the present invention will subsequently become more clearly apparent upon reference to the following description in the specification.

In the drawings:

FIG. 2 is a side elevation of the bale stacking trailer of FIG. 1.

FIG. 3 is a transverse vertical section through the forward bale receiving end of the bale stacking trailer taken on line 3—3 of FIG. 1.

FIG. 4 is a transverse vertical section through the lateral bale shifting mechanism of the stacking trailer taken on line 4—4 of FIG. 1.

FIG. 7 is a longitudinal vertical section through the bale stacking trailer of the present invention showing the bale counting device thereof in side elevation.

FIG. 8 is a fore-shortened side elevation of an hydraulic cylinder connected to the lateral bale shifting arm of FIGS. 1 and 4 showing an hydraulic jack reversing valve and cam mechanism disposed thereon.

FIG. 9 is a side elevation of a second form of the bale lifting mechanism modified from the lifting mechanism of FIGS. 5 and 6.

FIG. 10 is a horizontal section through the second form of bale lifting mechanism taken on line 10—10 of FIG. 9.

Figure 1:
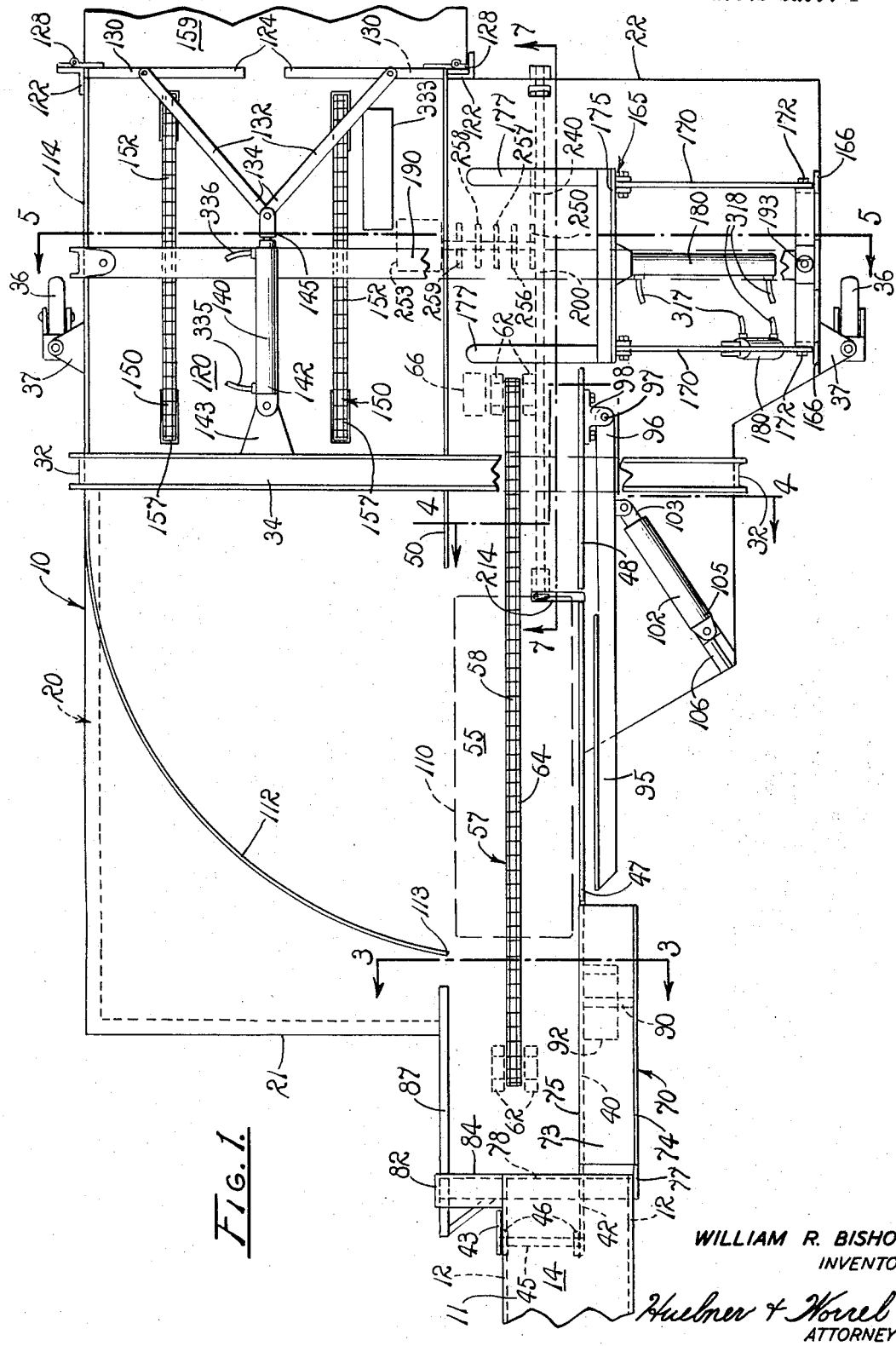
FIG. 1 is a top plan view of the bale stacking trailer embodying the principles of the present invention shown connected to the bale discharging chute of a baler.

Referring more particularly to the drawings, a bale stacking trailer embodying the principles of the present invention is indicated generally by the reference numeral 10. As best shown in FIGS. 1 and 2, the bale stacking trailer is mounted on the rearward end of a bale discharge chute 11 of a baler having opposite side walls 12 and top and lower walls 14 and 15, respectively.

The bale stacking trailer 10 provides an elongated frame 20 having predetermined forward and rearward ends 21 and 22, respectively. The frame includes a plurality of edgewardly disposed channel rail members 25 marginally extended about the frame in supporting relation to a floor plate 27. The floor plate is further supported by an intermediate channel rail member 29 extended longitudinally of the frame and by a transversely disposed intermediate channel member, all of which are connected as by welding or the like.

The frame 20 further provides a pair of opposite upstanding rail members 32 which are upwardly extended from the intermediate transversely disposed rail member 30 for interconnection at their upper ends by a transversely extended upper rail member 34. The frame is supported for earth traversing movement on a pair of opposite caster wheels 36 individually mounted for swiveling movement about substantially vertical axes on mounting brackets 37 transversely outwardly extended from the sides of the frame adjacent to the rearward end thereof.

As best shown in FIGS. 1 and 2, a side wall 40 is disposed in upright position along the marginal edge of the frame adjacent to the forward end 21 thereof. The side wall provides a forwardly extended mounting arm portion 42 which cooperates with an identical forwardly extended arm disposed centrally of the forward end of the frame in spaced parallel relation to the arm 42. An elongated pivot shaft 45 is extended through the arms and through a pair of mounting brackets 46 connected in depending relation to the lower wall 15 of the baler chute 11. As best shown in FIG. 2, the side wall 40 is rearwardly extended along the frame and provides an intermediate downwardly stepped notched portion 47. The side wall terminates in an upwardly extended rear wall portion 48 adjacent to the upstanding rails 32 of the frame.

An opposite rearwardly disposed inner wall 50 is mounted on the frame 20 in upstanding relation in transversely spaced substantially parallel relation to the side wall 40. The walls form therebetween an elongated rectilinear path 55 for bale movement longitudinally of the frame laterally offset from the bale chute 11. A bale conveyor 57 is mounted in central longitudinally aligned relation on the frame within the bale path 55 for motivating bales from the forward receiving end 21 of the frame toward the rearward end 22 thereof. The conveyor provides an endless chain 58 trained about a pair of longitudinally spaced sprockets 59 mounted beneath the floor plate 27 of the frame on shafts 60 journalled in bearing blocks 62 secured to the underside of the floor plate. The chain extends through the floor plate adjacent to the bearing blocks to provide an upper run 64 slidably engaging the upper surface of the floor plate. The chain is continuously driven through the shaft 60 adjacent to the rearward end of the frame by an hydraulic motor 66 connected to the shaft.

A bale turning device generally indicated by the reference numeral 70 is disposed at the forward end of the frame. As best shown in FIGS. 2 and 3, the bale turning device provides an elongated L-shaped wall, as viewed in cross section which has a lower horizontal bed portion 73 and an outer upstanding wall 74. The bed portion provides an inner side edge 75 disposed in coplanar relation with the outer side wall 40 of the frame. The wall 74 has a forwardly extended arm 77 rigidly mounted on one end of an elongated transversely extended sleeve 78. The sleeve is journaled on a shaft 79 supported in a pair of opposite brackets 90 and 92. The bracket 90 is disposed at one side of the baler chute 11 in depending relation from the side wall 12. The opposite side 12 of the chute mounts the bracket 82 in outwardly spaced relation to the opposite wall of the chute by a hanger arm 84 and horizontal brace 85.

An elongated bale constraining rod 87 is rearwardly extended from the hanger arm 84 in longitudinally spaced aligned relation with the inner wall 50 of the frame. The rearward end of the bale turning device is rested upon a support rod 90 rigidly mounted on a pedestal frame 92 secured to the marginal side channel rail 25 of the frame 20 adjacent to the side wall 40. With such arrangement, the bale turning device 70 is permitted independent pivotal movement relative to the bale chute 11 and to the bale stacking trailer so as dependably to maintain its substantially horizontal position behind the baler chute in optimum bale receiving relation when encountering depressions and elevations in the terrain traversed by the frame.

An elongated bale shifting arm 95 is disposed on the frame adjacent to the side wall 40 for horizontal lateral swinging movement through the notch 47 and through the path 55 of bale movement. The arm provides a mounting end 96 connected to an upright pivot post 97. The pivot post is journaled in a pair of upper and lower bearing blocks 98, secured to the rearward portion 48 of the side wall. An hydraulic jack 102 provides a rod end 103 pivotally connected to the mounting end 96 of the arm and an opposite cylinder end 105 pivotally mounted on an upstanding pedestal 106 secured to the frame. During lateral swinging movement of the arm, the bales, one of which is shown by the dashed lines 110, are constrained against the arm by an arcuately curved wall 112. The curved wall is disposed in upright position on the forward end of the frame and has a forward end 113 disposed rearwardly adjacent to the rearward end of the bale constraining rod 87 and a continuous rearwardly extended substantially straight wall portion 114 which terminates at the rearward end 22 of the frame.

The bales 110 engaged by the shifting arm 95 are motivated laterally rearwardly of the longitudinal bale path 55 and into a bale stack forming station 120 adjacent to the rearward end 22 of the frame 20 between the inner wall 50 and the straight portion 114 of the arcuate wall 112. A pair of upright elongated angle rails 122 are mounted on the rearward end of the frame individually adjacent to the wall 114 and the inner wall 50. A pair of swinging doors 124 providing upper and lower slats 125 and 126, respectively, are individually pivotally mounted on the upright rails 122 by hinges 128. The doors include upper arms 130 disposed in the plane of the slats which individually mount actuating links 132 extended inwardly of the forming station and provide overlapping inner ends 134. An hydraulic jack 140 provides a cylinder end 142 pivotally mounted on a bracket 143 secured to the upper rail 34 of the frame 20. The jack includes a rod end 145 pivotally mounted on the overlapping inner ends 134 of the links.

A pair of bale stack ejecting discharge conveyors 150 are mounted beneath the floor plate 27 of the frame 20 within the bale stack forming station in transversely spaced substantially parallel relation. Each conveyor includes an endless chain 152 trained about longitudinally spaced sprockets 154 which are mounted for rotation on shafts 155 journaled in bearing blocks 156 secured beneath the floor plate. The chains include upper runs 157 extended through the floor plate for sliding engagement with the upper surface thereof and are driven by an hydraulic motor 158 connected to the rearwardly disposed shaft 155 for rearward movement toward the doors 124. An elongated ramp 159 is pivotally mounted on the frame beneath the doors in trailing relation to the stack forming station.

A bale lifting mechanism generally indicated by the reference numeral 165 is mounted on the rearward end of the frame transversely adjacent to the bale stack forming station 120. The bale lift mechanism provides a pair of upright support rails 166 upwardly extended from the frame above the side rail 25 which provide converging upper portions 167 interconnected at their upper ends by a cross brace 168. Pairs of elongated links 170 are individually pivotally mounted in elevationally spaced relation upon the upright rails in parallelogram arrangement by pivot pins 172 and 173. A lift frame 175 mounting a pair of elongated L-shaped transversely extended forks 177 is pivotally mounted on the opposite ends of the links in aligned relation with the rectilinear bale movement path 55. An hydraulic liftjack 180 provides a cylinder end 182 pivotally connected to a bracket 183 on the frame and a rod end 184 pivotally connected to the lowermost link 170 for elevating the forks.

A bale pusher plate 186 is mounted on the lift frame 175 intermediate the forks 177. The plate is mounted on the rod end 187 of an hydraulic cylinder 188 having a cylinder end 189 rigidly mounted on the lift frame for extension of the pusher plate longitudinally outwardly of the forks toward the bale stack forming station 120.

Figure 5:
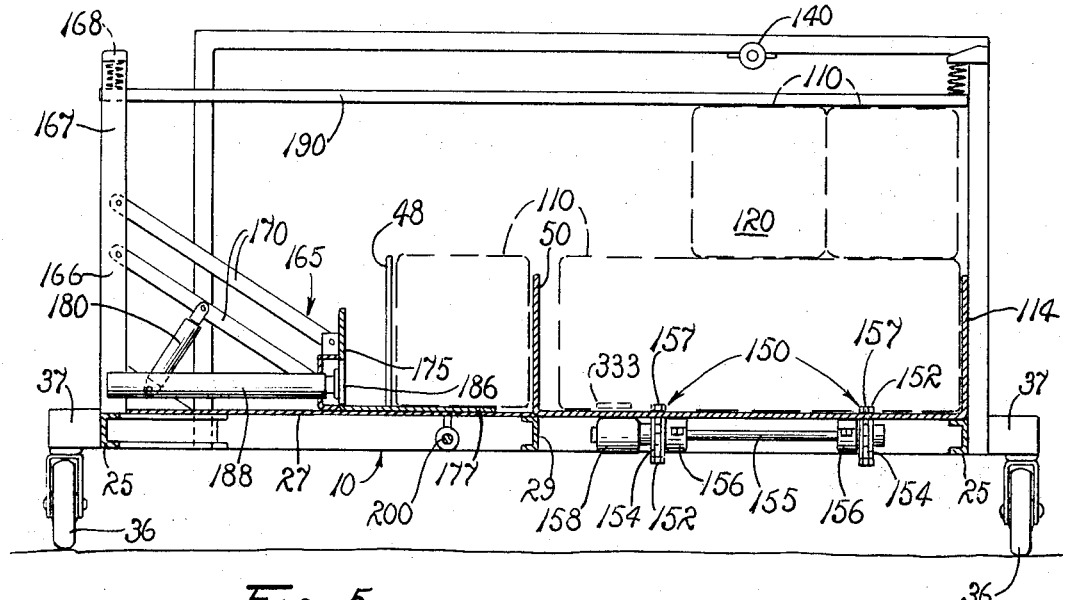
FIG. 5 is a transverse vertical section through the bale lifting and bale forming station of the stacking trailer of the present invention taken on line 5—5 of FIG. 1.

As best shown in FIGS. 1, 2 and 5, a bale tension rod 190 is extended transversely of the frame above the lifting mechanism suspended at its opposite ends on plungers 192, one of which is extended through the upper cross braces 167. The plunger at the opposite end of the rod is extended through a bracket 193 mounted on an upright rail 194 at the opposite side of the frame 20. The plungers include enlarged upper head portions rested against the upper surface of the brace 168 and the bracket 193. A compression spring is disposed about the plunger rods normally to position the tension rod downwardly from the brace and bracket.

With particular reference to FIG. 7 an elongated bale trip control rod 200 is mounted beneath the floor plate 27 of the frame 20 in longitudinally extended relation beneath the path 55 of bale movement. The rod is axially slidable through a pair of axially spaced forwardly disposed bearing brackets 202 and 204, and a pair of rearwardly disposed bearing brackets 205 and 206. An elongated tubular sleeve 210 is rotatably mounted on the rod between the forward bearing brackets for limited axial movement by a stop collar 211 rigidly secured to the rod by a set screw 212. An elongated forward bale trip lever 214 is extended through an opening 215 in the floor plate 27 of the frame 20 for extension into the bale movement path 55. The opening 215 is continuous with a slot 217 in the rearward portion 48 of the side wall 40 for transverse swinging movement of the trip level outwardly of the path 55 of bale movement to the dashed line position shown in FIG. 4. Such movement is accomplished by an hydraulic jack 220 having a rod end 221 privotally connected to the trip lever and an opposite cylinder end 222 pivotally connected to a mounting bracket 224 mounted in depending relation from the underside of the floor plate 27 of the frame 20.

A rearward bale trip lever 230 is integrally secured to a sleeve 233 rigidly mounted on the rearward end of the control rod between the rearward bearing brackets 205 and 206. The trip levers 230 and 214 are normally positioned to the left, as viewed in FIG. 7, by a compression spring 234 compressed between the forwardmost rearward bearing bracket 205 and a stop collar 236 rigidly secured to the rod. A stop lever 240 is pivotally mounted on the rod intermediate its ends by a pivot bolt 241 extended therethrough. The lever provides a forwardly extended counter wheel engaging end 243 and an opposite rearward end 244. An elongated tension spring 246 is connected between the rearward end of the lever and the frame normally to urge rotation of the rearward end of the lever in a clockwise direction, as viewed in FIG. 7, between a pair of upper and lower stops 247 and 248, respectively, mounted on the frame 20.

A bale counterwheel 250 is mounted for rotation on an elongated drive shaft 252 in axially extended relation from an hydraulic drive motor 253 disposed beneath the floor plate 27 of the frame 20. The wheel provides a plurality of notched segments 254 corresponding in number to the number of bales to be formed in each stack within the bale stack forming station 120. The hydraulic motor continually urges the counterwheel for rotation in a clockwise direction, as viewed in FIG. 7, until stopped by receipt of the forward end 243 of the stop lever 240 within one of the notched segments 254 thereof.

Figure 11:
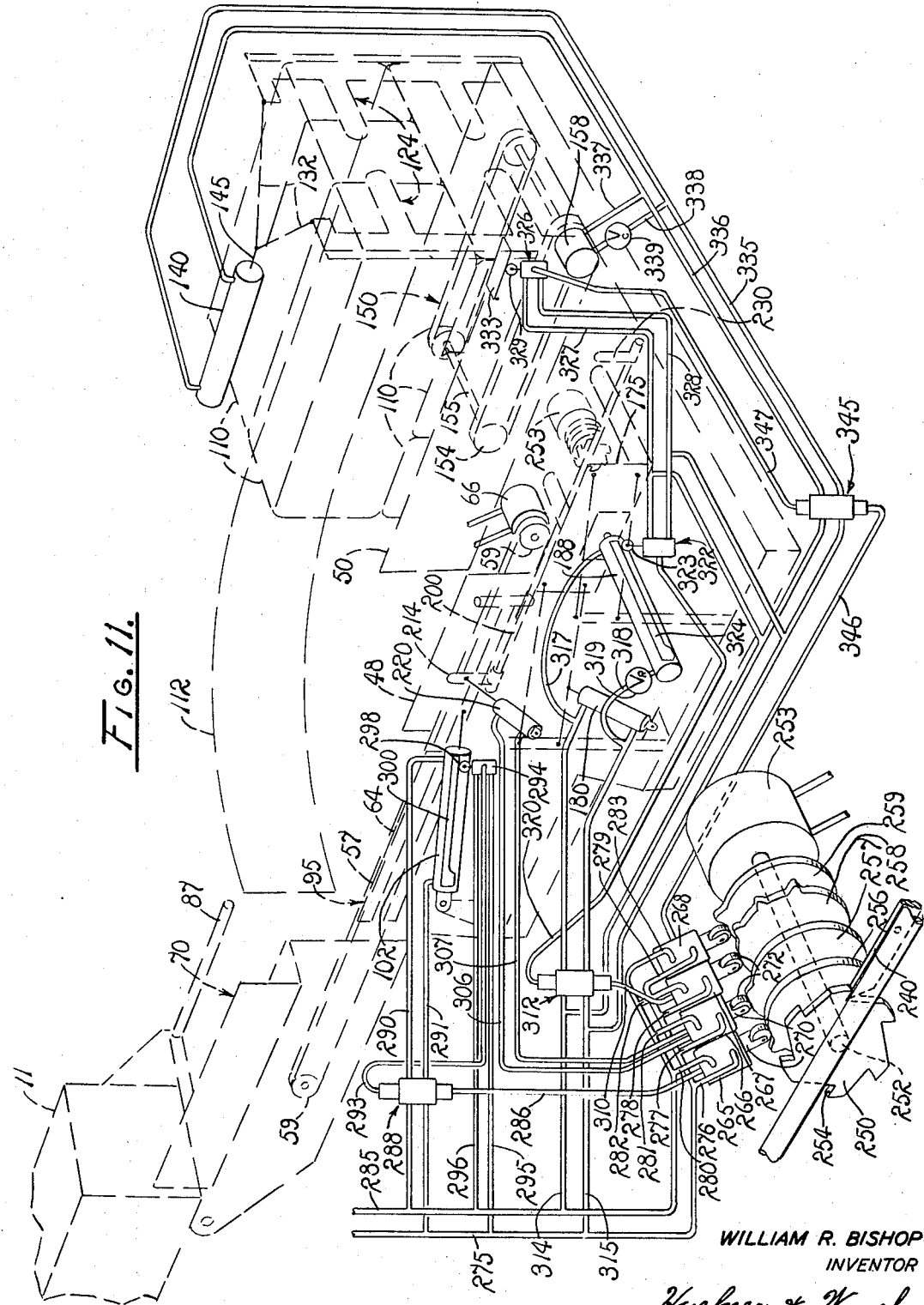
FIG. 11 is a schematic diagram of the hydraulic control system for the bale stacking trailer of the present invention showing the bale counting wheel and associated camming discs in perspective.

An hydraulic control system, as best shown in FIG. 11, is provided for sequential operation of the various previously described hydraulic cylinders for motivating bales into and out of the bale stack forming station 120. Such sequential action is provided by a plurality of cammings discs 256, 257, 258, and 259 which are rigidly mounted in axially spaced relation on the drive shaft 252 between the hydraulic motor 253 and the bale counterwheel 250. Each of the cams has a two-position spool valve 265, 266, 267 and 268 individually associated therewith. Each of the valves has an outwardly extended spring biased spool actuating rod 270 which individually mounts a roller 272 in rolling engagement against their respective cams.

The cam valves 265, 266, 267 and 268 are individually connected to a main supply conduit 275 by a plurality of inlet branch conduits 276, 277, 278, and 279 individually connected to their respective valves. A plurality of outlet branch conduits 280, 281, 282, and 283 are individually connected to their respective cam valves and to a common main return conduit 285. A pilot line 286 is connected to the cam valve 265 and at its other end is connected to one end of a four-way hydraulic control valve 288. The control valve 288 is disposed within a pair of conduits 290 and 291, the latter of which is connected between the main supply conduit 275 and the cylinder end of the hydraulic jack 102 controlling the bale shifting arm 95. The conduit 290 is connected between the main return conduit 285 and the head end of the hydraulic jack 102. The opposite end of the control valve 288 has a pilot line 293 connected thereto which is connected at its opposite end to a reversing valve 294. Fluid pressure in the pilot lines 286 and 293 is effective to shift the valve between two positions alternately for straight-through or cross-flow of fluid through the conduits 290 and 291.

Hydraulic fluid supply and return branch lines 295 and 296, respectively, are connected to the reversing valve 294 and are respectively connected at their opposite ends to the main supply conduit 275 and the main return conduit 285. As best shown in FIG. 8, the housing valve 294 provides an extended spring biased spool rod 297 which mounts a cam follower roller 298 thereon. The roller engages an elongated camming bar 300 which provides a screw threaded end 301 connected to the rod end 103 of the jack. The camming bar is slidably supported on the cylinder end 105 of the jack by a bearing bracket 302 secured to the cylinder. The camming bar has a ramp portion 304 at its end adjacent to the cylinder which is engageable with the roller 298 to depress the spool rod 197 of the reversing valve 294.

A pair of conduits 306 and 307 are extended from the cam valve 266 for individual connection at their opposite ends to the rod end and cylinder end, respectively, of the hydraulic jack 220 for raising and lowering the trip lever 214. The cam valve 267 has a pilot line 310 extended therefrom for connection to one end of a four-way hydraulic control valve 312. The control valve 312 is identical to the control valve 288 and is connected within a pair of conduits 314 and 315 individually connected between the main return conduit 285 and the head end of the cylinder of the hydraulic lift jack 180 and between the main supply conduit 275 and the cylinder end of the jack 180, respectively, for raising and lowering the forks 177.

Branch conduits 317 and 318 are individually connected to the conduits 314 and 315, respectively, for connection to the rod and cylinder ends, respectively, of the pusher plate hydraulic jack 188. A two-way pressure relief valve 319 is disposed in the conduit 318 to provide the desired sequential extension of the jacks 180 and 188. A pilot line 320 is connected to the opposite end of the control valve 312 and at its opposite end to a reversing valve 322 having a roller 323 thereon for engagement with a cam 324 on the jack 188 identical to the reversing valve and cam arrangement shown in FIG. 8 for the hydraulic jack 102. A reversing valve 326 is connected to the reversing valve 322 by a pair of conduits 327 and 328. The reversing valve 326 provides a cam roller 329 which is engageable by a pressure plate 330 pivotally mounted on the floor plate 27 of the frame 20 beneath the bale stack forming station 120.

A pair of supply and return conduits 335 and 336, respectively, are connected at one of their ends to the conduits 314 and 315 ahead of the four-way control valve 312 for connection at their opposite ends to the rod and cylinder ends, respectively, of the hydraulic door closing jack 140. A pair of branch conduits 337 and 338 are connected between the supply and return conduits 335 and 336 and the discharge conveyor motor 158. The branch conduit 338 has a check valve 339 therein to prevent reverse flow and reverse rotation of the motor. A four-way hydraulic control valve 345 is mounted in the supply and return conduits 335 and 336 and provides a pilot line 346 at one end connected to the cam valve 268 and a pilot line 347 at its opposite end connected to the reversing valve 326 at the bale stack forming station.

A second form of bale lifting mechanism is generally indicated by the reference numeral 360 in FIGS. 9 and 10. This form provides a superstructure 362 mounted on the rearward end of the frame which provides a pair of spaced substantially upright channels 363. The superstructure rotatably mounts at its upper end an elongated cylindrical drum 365 having a peripheral portion aligned with the longitudinal centers of the channels. A lift frame 367 is mounted between the channels and has pairs of opposite rollers 368 extended into the channels in rolling engagement therewith. A pair of spaced substantially parallel forks 370 are rigidly mounted on the frame to extend inwardly of the path 55 of bale movement adjacent to the bale stack forming station 120. A bale pusher plate 372 is mounted on the lift frame intermediate the forks. An hydraulic jack 375 having a cylinder end 376 is mounted on the lift frame by brackets 377 welded thereto and provides a rod end 378 connected to the pusher plate. A pair of elongated chains 380 are secured at their upper ends to the periphery of the drum in depending relation therefrom for connection to the lift frame 367. An hydraulic motor 382 is mounted on the superstructure in driving relation the drum for rotating the same in a clockwise direction, as viewed in FIG. 9, to wrap the chains thereabout and to elevate the forks 370. The conduits 314 and 315 connected in the first form to the hydraulic lift jack 180 are in the second form connected to the hydraulic motor 382 to effect such rotation of the drum. The conduits 317 and 318 connected in the first form to the bale pusher jack 188 are in the second form connected to the hydraulic jack 375.

Operation

The operation of the described embodiment of the subject invention is believed to be clearly apparent and is briefly summarized at this point. During movement of the baler, the bales 110 are periodically ejected from the bale chute 110 onto the bed portion 73 of the bale turning device 70. It is noted that the inner edge 75 thereof is disposed in a position short of the center of the discharge chute so that when the bale is completely free of the chute, it is tipped on its edge as it gravitates to the floor 27 of the trailer. The bale is thereby dropped on its edge in superimposed relation to the chain 58 of the conveyor 57 which carries the bale longitudinally rearwardly of the trailer through the path 55 of bale movement. Such movement continues until the bale engages the forward trip level 214 which moves the control rod 200 to the right, as viewed in FIG. 7, against the compression spring 234. Such movement carries the stop lever 240 with the rod to the right, disengaging its forward end 243 from the segment 254 of the bale counterwheel 250. As described, the drive motor 253 continually tends to rotate the counterwheel which rotation is permitted only upon release of the stop lever 240. Upon such release, the forward end of the lever is rotated upwardly by the tension spring 246 so as to be in position to enter the succeeding notch on the counterwheel upon return movement after discharge of the first bale from the longitudinal bale path 55.

Rotation of the counterwheel causes the lobe portion of the cam 256 to depress the spool rod 270 of the cam valve 265. This causes hydraulic fluid under pressure from the main supply conduit 275 to be connected through the cam valve 265 to the pilot line 286 leading to the four-way hydraulic control valve 288. Such pilot line pressure shifts the control valve 288 to a position permitting high pressure fluid to flow from the main supply conduit 275 therethrough to the cylinder end of the hydraulic jack 102. This pressure is effective to extend the rod end 103 of the jack to swing the bale shifting arm 95 laterally through the bale movement path 55. Such movement shoves the bale 101 laterally and rearwardly along the arc of the arcuate wall 112 of the frame and into the bale stack forming station 120. As the rod end of the jack 102 reaches the end of its stroke, the roller 298 on the spool rod 297 on the reversing rod 194 is depressed by engagement with the ramp portion 314 on the cam bar 300. Such movement opens the supply conduit 295 to admit high pressure from the main supply conduit 275 through the valve and into the pilot line 293 connected to the opposite end of the control valve 288. Such movement reverses the flow of actuating fluid through the conduits 290 and 291 to cause retraction of the rod end of the jack and return of the bale shifting arm 95 prior to movement of a second bale along the path 55 of bale movement.

The identical operation occurs for the second and third bales which are alternately positioned against the preceding bale and shoved rearwardly farther into the bale stack forming station. The first three bales are thereby positioned in the bale stack forming station on their edges in intimate side-by-side relation to form a solid lower layer for the stack and are longitudinally extended at right angles to the direction of trailer movement. Also, during lateral swinging movement of the shift arm 95 to actuate the third bale, the second cam valve 266 is actuated by rotation of the came disc 257 to open communication between the main supply conduit 275 and the conduit 306 to pressurize the rod end 221 of the trip lever hydraulic jack 220. As best shown in FIG. 4, such actuation carries the trip lever 214 to the dashed line position shown in FIG. 4 outwardly of the bale path 55.

Figure 6:
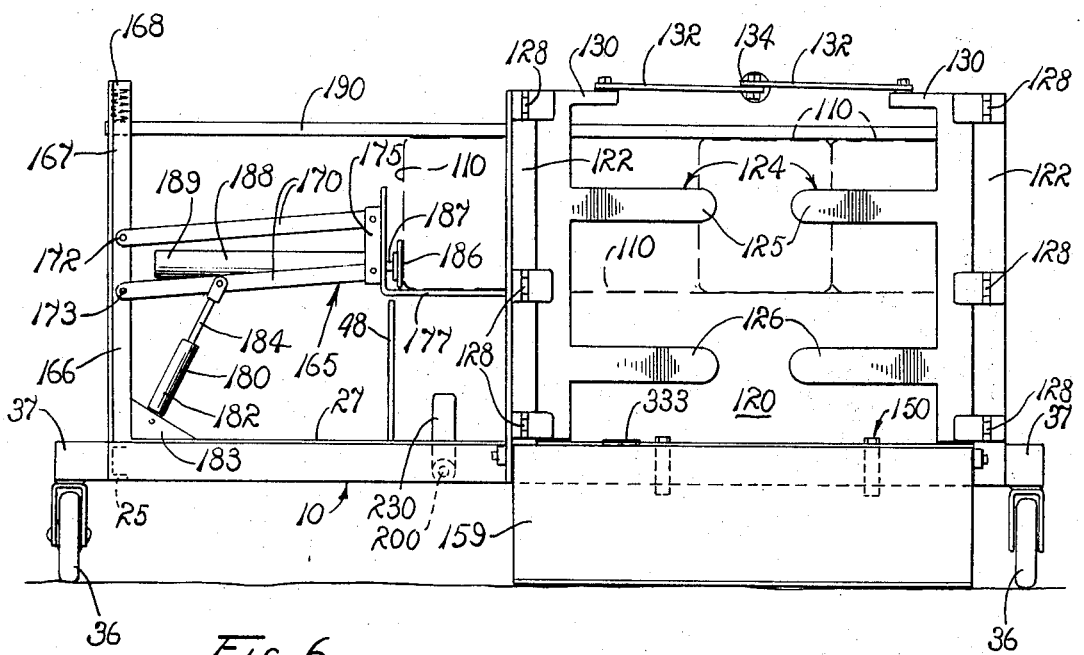
FIG. 6 is a rear elevation of the bale stacking trailer of the present invention showing the bale lifting mechanism in elevated position.

The number four bale is then carried the full length of the conveyor 57 and disposed in superimposed relation on the forks 177. During such movement, the bale strikes the rearward trip lever 230 which again causes the control rod 200 to be shifted to the right against the compression spring 234 to retract the stop lever 240 from the third notch of the counterwheel 250. Such retraction permits further rotation of the counterwheel which, through the cam roller 272, shifts the rod 270 in the cam valve 267 to permit high pressure fluid to flow from the supply conduit 275 through the pilot line 310 to shift the four-way hydraulic control valve 312. Such movement directs high pressure fluid from the supply conduit 275 through the conduit 315 and through the valve 312 to pressurize the cylinder end 182 of the lift jack 180. During such extension of the hydraulic jack, the fourth bale is lifted by the forks 177 to the elevated position shown in FIG. 6 upwardly above the lower layer of bales in the bale stack forming station 120 against the tension rod 190. When this jack 180 is fully extended, pressure in conduit 315 increases sufficiently to open the relief valve 319 to bypass high pressure fluid to the cylinder end 189 of the hydraulic jack 188 through conduit 318 to extend the pressure plate 186 for depositing the fourth bale in superimposed right angular overlapping relation on the first layer of bales. When the rod end of the hydraulic jack 188 is fully extended, the cam roller 323 of the reversing valve 322 engages the cam 324 on the rod end 187 of the jack to reverse the flow of hydraulic fluid to retract the pusher plate and the lift jack 180. Such retraction lowers the lift forks to the position shown in FIG. 5 in position to receive the fifth and sixth bales thereon.

The identical operation is followed for the fifth and sixth bales which are shoved across the tops of the lower layer of bales during each subsequent discharge of such bales from the forks 177. After placement of the sixth bale, the cam valve 268 is actuated by the cam 259 to provide pilot pressure through the pilot line 346 to shift the hydraulic control valve 345. Such movement causes high pressure fluid to be directed through the conduit 335 to the cylinder end 142 of the hydraulic jack 140 to extend the rod end 145 thereof. Such movement opens the doors 124 of the stack forming station 120. At the same time, the motor 158 is actuated to rotate the bale stack discharge conveyors 150 for moving the stack of bales outwardly of the bale stack forming station 120. During discharge therefrom, the bales slide rearwardly down the ramp 159 and into ground engagement in the same unitarily stacked configuration as formed in the forming station. Upon removal from the forming station, the pressure plate 333 is released upwardly to actuate the reversing valve 326 to shift the control valve 345 by pressurizing pilot line 347 for reversing the flow of pressurized fluid to the door closing cylinder 146. At such time, the hydraulic motor 158 is stopped due to the check valve 339 preventing reverse flow of fluid therethrough.

The operation of the second form 360 of the bale lifting mechanism is substantially identical to the operation of the first form. As the fourth, fifth, and sixth bales are disposed upon the forks, the hydraulic motor 382 is sequentially actuated by the control system at the same time as the hydraulic lift jack 180 to rotate the drum 365 in a clockwise direction, as viewed in FIG. 9. During such rotation, the chains 380 are wrapped thereabout which vertically lifts the forks 370 and the bale thereon to the same position as that shown in FIG. 6 of the first form. The hydraulic jack 375 is then actuated in the same manner as the hydraulic jack 188 of the first form to extend the pusher plate 372 outwardly along the forks to eject the bale therefrom. The jack 375 and motor 382 are then reversed at the end of the stroke of the rod end 378 of the jack simultaneously to retract the pusher plate and to lower the forks.

In view of the foregoing, it is readily apparent that the structure of the present invention has provided an improved bale stacking trailer which is effective to form a multi-layer, precisely square stack of bales thereon and which unitarily discharges the bales in such precisely stacked relation. Such stacking operation is completely automatic and renders unnecessary manual handling of the bales on the baler which deposits them on the ground in stacked relation for optimum stability during subsequent handling and storage operations. The bale stacking trailer of the present invention can be easily connected to any size or type of baler and easily accommodates a wide variety of bale sizes without impairing the improved stacking arrangement of bales thereon.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A bale stacking trailer comprising an elongated frame adapted to be drawn behind a baler having an elongated bale discharge chute extended therefrom, bale conveying means on the frame providing a rectilinear path of bale movement longitudinally of the frame, a bale stack forming station on the frame laterally spaced from said path, bale shifting means laterally rearwardly movable through said path alternately to motivate a predetermined number of bales from the path directly into said stack forming station whereby the bales are horizontally rotated substantially 90°, bale lifter means disposed on the frame in position to receive subsequent bales in said path and to elevate and deposit such subsequent bales therein on bales previously placed in the forming station by said bale shifting means in superimposed right angular overlapping relation to form a substantially square stack, and bale ejecting means on the frame within said forming station unitarily to discharge the stack of bales from the trailer.

2. A bale stacking trailer comprising an elongated frame adapted to be drawn behind a baler having an elongated bale discharge chute extended therefrom, bale conveying means positioned on the frame to receive bales ejected from said discharge chute of the baler providing a rectilinear path of bale movement longitudinally of the frame, a bale stack forming station on the frame disposed laterally of said path of movement, bale shifting means disposed adjacent to said path and ahead of said stack forming station for alternate engagement with a predetermined number of bales successively to move them laterally rearwardly directly into said forming station whereby the bales are horizontally rotated substantially 90°, bale lifter means on the frame in longitudinally spaced relation to said shifting means within said path of bale movement to elevate and deposit subsequent bales therein upon bales previously placed in the forming station by said shifting means in superimposed right angular overlapping relation to form a substantially square stack, and bale ejecting means on the frame within said forming station unitarily to discharge the stack of bales from the trailer.

3. A bale stacking trailer comprising an elongated frame having a rearward end and adapted to be drawn behind a baler providing an elongated bale discharge chute extended therefrom, bale conveying means on the frame having a bale receiving portion positioned to receive bales ejected from said discharge chute of the baler and providing a rectilinear path of bale movement longitudinally of the frame, a bale stack forming station on the frame disposed laterally of said path and adjacent to said rearward end of the frame, a bale shifting arm pivotally mounted on the trailer for lateral movement through said path intermediate the bale receiving portion of the conveying means and said rearward end of the frame alternately to motivate a predetermined number of bales successively, laterally, rearwardly directly into said forming station whereby the bales are horizontally rotated substantially 90°, bale lifter means mounted on the frame in position to receive subsequent bales in said path in rearwardly spaced relation to said shifting arm adjacent to said rearward end of the frame and adjacent to said forming station to elevate and deposit such subsequent bales upon bales previously placed in the forming station by said shifting arm in superimposed right angular overlapping relation to form a substantially square stack, and bale ejecting means on the frame within said forming station unitarily to discharge the stack of bales from the trailer.

4. A bale stacking trailer comprising an elongated frame having a rearward end and adapted to be drawn behind a baler providing an elongated bale discharge chute extended therefrom; bale conveying means on the frame having a bale receiving portion positioned to receive bales ejected from said discharge chute of the baler and providing a rectilinear path of bale movement longitudinally of the frame; a bale stack forming station on the frame disposed laterally of said path and adjacent to said rearward end of the frame; a bale shifting arm pivotally mounted on the frame for lateral movement through said path intermediate the bale receiving portion of the conveying means and said rearward end of the frame alternately to motivate a predetermined number of bales successively, laterally, rearwardly into said forming station whereby the bales are horizontally rotated substantially 90°; bale lifter means disposed in longitudinally rearwardly spaced relation to said shifting means within said path adjacent to said rearward end of the frame and adjacent to said forming station; control means within said path operationally connected to said shifting arm so as to render the arm inoperative after motivation of said predetermined number of bales into the forming station to permit subsequent bales to move therepast on to said lifter means for elevation and deposit of such subsequent bales on bales previously placed in the forming station by said shifting arm in superimposed right angular overlapping relation to form a substantially square stack; and bale ejecting means on the frame within said forming station unitarily to discharge the stack of bales from the trailer.

5. A bale stacking trailer comprising an elongated frame having a rearward end and adapted to be drawn behind a baler providing an elongated bale discharge chute extended therefrom; powered bale conveying means on the frame providing a rectilinear path of bale movement longitudinally of the frame, said conveying means providing an off-set bale receiving portion aligned with said bale discharge chute on the baler to tip bales discharged therefrom edgewardly onto said bale conveying means; a bale stack forming station on the frame disposed laterally of said path and adjacent to said rearward end of the frame; a bale shifting arm pivotally mounted on the trailer for lateral movement through said path intermediate the bale receiving portion of the conveying means and said rearward end of the frame alternately to motivate a predetermined number of bales successively, laterally, rearwardly into said forming station whereby the bales are horizontally rotated substantially 90°; bale lifter means mounted on the frame for elevational movement disposed in longitudinally rearwardly spaced relation to said shifting arm within said path adjacent to said rearward end of the frame and adjacent to said forming station; trip means within said path operationally connected to said shifting arm so as to render the arm inoperative after motivation of said predetermined number of bales into the forming station and to permit an equal number of subsequent bales successively to move therepast onto said lifter means for elevation and deposit of such subsequent bales on bales previously placed in the forming station by said shifting arm in superimposed right angular overlapping relation to form a substantially square stack; and bale ejecting means on the frame within said forming station unitarily to discharge the stack of bales from the trailer.

6. A bale stacking trailer comprising an elongated frame having a rearward end and adapted to be drawn behind a baler providing an elongated bale discharge chute extended therefrom; powered bale conveying means on the frame providing a rectilinear path of bale movement longitudinally of the frame, said conveying means providing an off-set bale receiving portion aligned with said bale discharge chute on the baler to tip bales discharged therefrom edgewardly onto said bale conveying means; a bale stack forming station on the frame disposed laterally of said path and adjacent to said rearward end of the frame; a bale shifting arm pivotally mounted on the trailer for lateral movement through said path intermediate the bale receiving portion of the conveying means and said rearward end of the frame alternately to motivate a predetermined number of bales successively, laterally, rearwardly into said forming station whereby the bales are horizontally rotated substantially 90°; bale lifter means mounted on the frame for elevational movement disposed in longitudinally rearwardly spaced relation to said shifting arm within said path adjacent to said rearward end of the frame and adjacent to said forming station; trip means within said path operationally connected to said shifting arm so as to render the arm inoperative after motivation of said predetermined number of bales into the forming station and to permit an equal number of subsequent bales successively to move therepast onto said lifter means for elevation and deposit of such subsequent bales on bales previously placed in the forming station by said shifting arm in superimposed right angular overlapping relation to form a substantially square stack; and bale ejecting means on the frame within said forming station unitarily to discharge the stack of bales from the trailer; and means powering said shifting arm, said lifter means, and said ejecting means in sequential relation incident to said movement of bales along said rectilinear path and through said forming station.

7. A bale stacking trailer comprising an elongated frame having a rearward end and adapted to be drawn behind a baler providing an elongated bale discharge chute extended therefrom; powered bale conveying means on the frame providing a rectilinear path of bale movement longitudinally of the frame, said conveying means providing an off-set bale receiving portion aligned with said bale discharge chute on the baler to tip bales discharged therefrom edgewardly onto said bale conveying means; a bale stack forming station on the frame disposed laterally of said path and adjacent to said rearward end of the frame; a bale shifting arm pivotally mounted on the trailer for lateral movement through said path intermediate the bale receiving portion of the conveying means and said rearward end of the frame alternately to motivate a predetermined number of bales successively, laterally, rearwardly into said forming station to form a first layer whereby the bales are horizontally rotated substantially 90°; bale lifter means mounted on the frame for elevational movement disposed in longitudinally rearwardly spaced relation to said shifting arm within said path adjacent to said rearward end of the frame and adjacent to said forming station; trip means within said path operationally connected to said shifting arm so as to render the arm inoperative after motivation of said predetermined number of bales into the forming station and to permit an equal number of bales successively to move therepast onto said lifter means for elevation above said first layer of bales; and pusher means on the lifter means to discharge said subsequent bales onto said first layer of bales in superimposed right angular overlapping relation to form a substantially square stack; bale ejecting means on the frame within said forming station unitarily to discharge the stack of bales from the trailer; and hydraulic control means powering said shifting arm, said lifter means, said pusher means, and said ejecting means in sequential relation incident to said movement of bales along said rectilinear path and through said forming station.

8. The bale stacking trailer of claim 7 wherein the hydraulic control means includes a continuous drive shaft; a plurality of cams mounted in spaced relation on the drive shaft; a plurality of valve members individually associated with said cams providing operating connection to said shifting arm, said lifter means, said pusher means, and said discharge means; a bale counting member mounted on the shaft having a plurality of segments corresponding to the number of bales in the stack; a stop member releasably alternately engageable with said segments of the counting member for holding the same against rotation; an elongated axially slidable rod pivotally mounting said stop member; tension means connected between the stop member and the rod for positioning the stop member in said holding position; and a pair of trip members mounted on the rod extended into said rectilinear path of bale movement individually adjacent to said bales to release said stop member from the counting wheel to permit rotary movement of the wheel and cams.

9. The bale stacking trailer of claim 7 wherein said bale lifter means comprises a plurality of elongated links disposed in parallelogram arrangement having ends pivotally mounted adjacent to the rearward end of the frame and opposite ends; a pair of elongated forks pivotally mounted on the opposite ends of the links within said rectilinear path of bale movement; and a pusher plate mounted on the forks for movement longitudinally along the forks to eject bales thereon into said stack forming station.

10. The bale stacking trailer of claim 7 wherein said bale lifter means provides a pair of elongated forks disposed within said rectilinear path of bale movement; an elongated cylindrical drum rotatably mounted in elevated position on the frame above the forks; a pair of elongated chains having upper end connected to the drum and opposite lower ends secured to the forks; and a pusher plate mounted on the forks for movement longitudinally therealong to eject bales thereon into said stack forming station.

References Cited

UNITED STATES PATENTS 222,419   12/1879   Owens _____ 56—166
1,648,252   11/1927   Aldrich et al. _____ 214—6

(Other references on following page)

| UNITED STATES PATENTS | | | |
|---|---|---|---|
| 2,655,271 | 10/1953 | Cole et al. | 214—6 |
| 2,723,039 | 11/1955 | Stueland | 214—140 |
| 2,853,171 | 9/1958 | Matthews | 56—473.5 |
| 2,993,610 | 7/1961 | Kughler | 214—6 |
| 3,085,696 | 4/1963 | Stainforth et al. | 214—6 |
| 3,197,043 | 7/1965 | Unger | 214—6 |

FOREIGN PATENTS 821,189    9/1959    Great Britain.

GERALD M. FORLENZA, *Primary Examiner.*

J. E. OLDS, G. F. ABRAHAM, *Assistant Examiners.*